July 7, 1970     F. W. DOMRES     3,519,042
PULP CUTTING AND LOADING MACHINE

Filed July 26, 1967     3 Sheets-Sheet 1

INVENTOR.
FRANKLIN W. DOMRES
BY
ATTORNEYS

INVENTOR.
FRANKLIN W. DOMRES
BY
ATTORNEYS

July 7, 1970  F. W. DOMRES  3,519,042
PULP CUTTING AND LOADING MACHINE
Filed July 26, 1967  3 Sheets-Sheet 3

INVENTOR.
FRANKLIN W. DOMRES
BY Price, Heneveld
Huizenga & Cooper
ATTORNEYS

United States Patent Office 3,519,042
Patented July 7, 1970

3,519,042
PULP CUTTING AND LOADING MACHINE
Franklin W. Domres, Rte. 1, Manistee, Mich. 49660
Filed July 26, 1967, Ser. No. 656,257
Int. Cl. B27c 9/00; B27b 9/00, 5/18
U.S. Cl. 144—3       12 Claims

ABSTRACT OF THE DISCLOSURE

Field use apparatus for high production cutting of pulp poles into uniform length "sticks," and loading of the cut sticks onto a haulage vehicle, employing in combination with a vehicle, a special cooperative pole evener and measuring means, special compacting and gripping means, hoisting means, and specially mounted cutoff means.

Background of the invention

This invention relates to apparatus for cutting poles which usually have a diameter of about 5"–24", and more particularly relates to high production field use apparatus capable of cutting pulp poles into uniform length sticks and loading the cut sticks onto a haulage vehicle and relates also to special work retaining means useful for this pole cutting apparatus and on other machinery.

Basically, the technique of pulp wood production conventionally includes the felling of trees as with chain saws, trimming off the branches and tops to obtain poles, snaking the poles into a loading area with tractors, cutting the individual poles into short sections called "sticks" by workmen with chain saws, collecting the individual cut sticks at a haulage vehicle, and loading the gathered sticks onto the haulage vehicle. These basic operations are performed in varying manner at each job due to terrain factors, accessibility of haulage vehicles, etc., but are similar to the sequence noted above. The latter steps of cutting, gathering, and loading require several men and several items of equipment, all working strenuously if production output is to be significant. This type of labor is not very desirable, so that help shortage is commonly experienced to hamper production efforts. Even with the proper amount of personnel, and if all of the items of equipment are constantly maintained in good operating efficiency, there is a definite limit on the practical output of several men using dangerous equipment and working in the same area. Potential production bottlenecks therefore constantly result. Even when high production is obtained, the length of the sticks may undesirably vary considerably.

Summary of the invention

It is the primary object of this invention to provide a unique piece of equipment which is capable, when operated by just one man, of readily and rapidly performing the otherwise rough, tedious, and tiresome tasks of measuring, cutting, hauling, and loading the sticks onto a haulage vehicle, with an output efficiency not attainable by a crew of men with several pieces of equipment, and with complete uniformity of length of the sticks.

Another object of this invention is to provide a special vehicle capable of moving directly into rough terrain field areas, gripping one or a plurality of pulp wood poles simultaneously, under the control of one operator, evening their ends, positioning the poles to cut exactly uniform length sections thereof, simultaneously and rapidly cutting the plurality of logs into controlled and uniform length sticks, and while the vehicle still has the cut sticks in its grasp, of loading them directly onto a haulage vehicle. As a result, it has been demonstrated that one operator with this one piece of equipment can actually readily cut and load 40 cords of pulpwood a day. This is a remarkable achievement, enabling the output production of pulpwood to be substantially increased, reducing the number of equipment items and the maintenance requirements significantly, and enabling the men to be placed on more desirable duties.

Another object of this invention is to provide a pulp cutting and handling vehicle that effectively and readily grips and secures first one or up to about a dozen, more or less, varying diameter poles, and holds them securely during cutting in a fashion to prevent significant saw blade pinching.

Another object of this invention is to provide a pole gripping and cutting machine that permits regulated infeed of a swinging saw into the poles without jamming of the saw due to too rapid infeed because of the weight of the saw, the "climb" feed nature of the saw teeth, and any slack in the mounting joints of the saw blade support mechanism.

Another object of this invention is to provide a pole cutting vehicle having a cutoff saw assembly capable of folding into a compact raised position for vehicle travel, capable of movement to a retracted safe position when poles are being picked up and clamped by the vehicle equipment, and capable of swinging through a substantial distance to cut off several poles without striking the ground.

Another object of this invention is to provide special workpiece gripping cable mechanism capable of readily grasping and securely retaining different size work loads composed of one or several workpieces, by the use of relatively simple mechanical components.

These and several other objects of this invention will become apparent upon studying the following specification in conjunction with the drawings.

Broadly the novel vehicular apparatus has, in combination, special pole evener and measuring means, special compacting, gripping, and hoisting means to grip and hoist a plurality of poles to cutting elevation, specially mounted shiftable cutoff saw means to cut the poles into sticks, the hoist means being elevatable to loading height and tiltable to cause the cut poles to be loaded directly onto a haulage vehicle.

Description of the preferred embodiment

Figure 1:
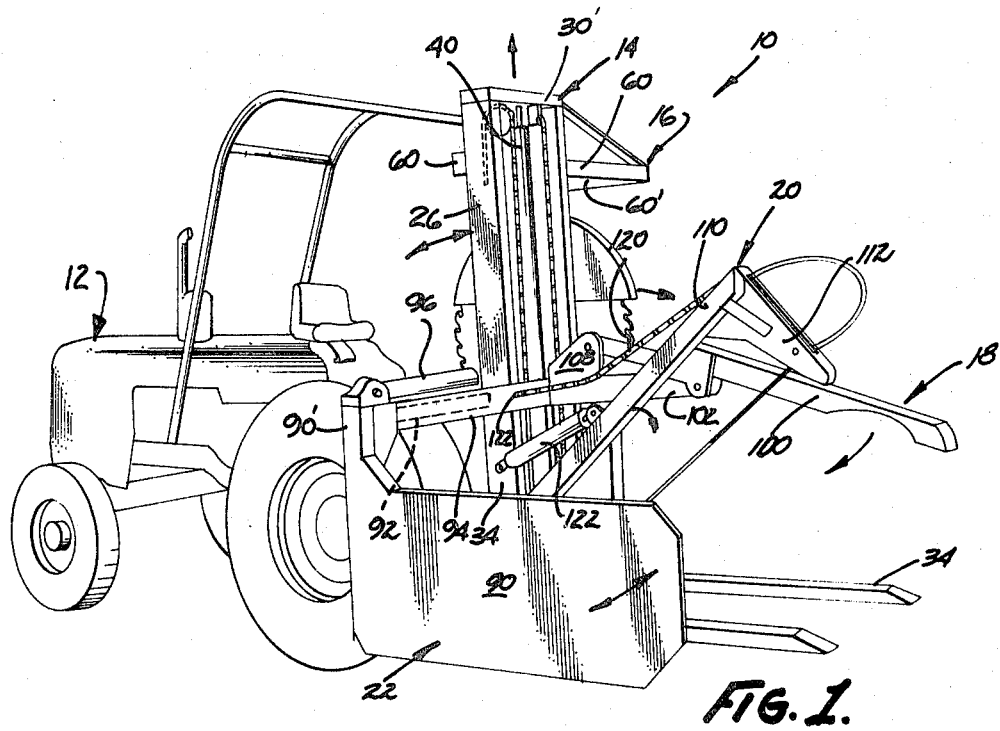
FIG. 1 is a perspective view of the novel machine shown from the left front end.

Referring now specifically to the drawings, the complete machine assembly 10 includes a powered vehicle subassembly 12 preferably of a tractor type, having a hoist fork lift subassembly 14 mounted on the rear thereof, controllably shiftable cutoff saw subassembly 16, pole compiling subassembly 18, pole clamping subassembly 20, and pole evener and measuring subassembly 22.

The powered vehicle subassembly 12 may include a suitable conventional tractor framework, having driving and steering wheels mounted in conventional fashion, and containing a power source such as an internal combustion engine 74. Since the end of the vehicle adjacent the driving wheels and opposite the steering wheels possesses the working equipment, this end is deemed the "front" end and will be referred to as such herein. The engine supplies power to the other operative subassemblies preferably by operating a first hydraulic pump 72 to operate the fluid motors on all of the other subassemblies except for rotation of the saw blade which has a fluid motor drive by pressurized fluid from a second hydraulic pump 73 as described hereinafter.

Mounted at the front of this vehicle is a fork lift hoist subassembly 14. This includes a vertically telescoping mechanism employing a pair of outer, upright, parallel pillars 26 pivotally mounted adjacent their middle at transverse pivot shaft 28 to flanges 29 on the vehicle. It also includes a pair of inner, parallel, upright slide members 26a interconnected at their upper ends by a top cross member 30'. The telescopic action between the inner and outer members is achieved by an elongated, centrally positioned, vertical fluid cylinder 40 having its lower end secured between the lower ends of outer members 26, and having the upper end of the piston rod attached to cross member 30' between the upper ends of inner members 26a. A vertically hoistable carriage 32 is mounted on the members to ride up and down the hoist under the hoisting action of the telescoping mechanism. It is suspended on roller chains 44 which has one end attached to this carriage, which also extend around sprockets rotatably mounted beneath cross member 30', and which have their other end affixed to the outer members 26. Thus, with hoisting of the inner members and raising of the sprockets, the chains are pushed up to pull the carriage up, as is conventional.

Figure 5:
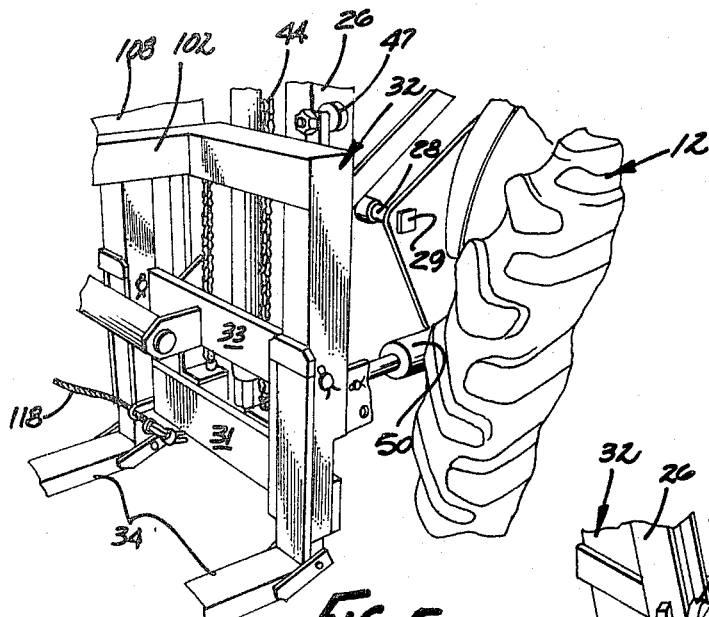
FIG. 5 is an enlarged fragmentary perspective view of the lower end of the hoist mechanism.

This carriage includes a pair of parallel, spaced, L-shaped, swinging fork members 34 having horizontal and vertical legs, the vertical legs being interconnected by cross elements 31, 33, and 35. The legs form a support platform. Inner rollers 45 (FIG. 6) prevent binding of the carriage with front to rear thrust loads, and side roller 47 (FIG. 5) prevents binding with side thrust loads. The entire hoist mechanism can be tilted forwardly and rearwardly about transverse pivot shaft 28 by contracting and extending fluid cylinder 50 which extends between the lower end of the hoist and the vehicle frame (FIG. 5). This tilting of the fork lift on the hoist is advantageous for effectively grasping poles to be cut, and for eventually unloading cut sticks, as will be described.

Figure 6:
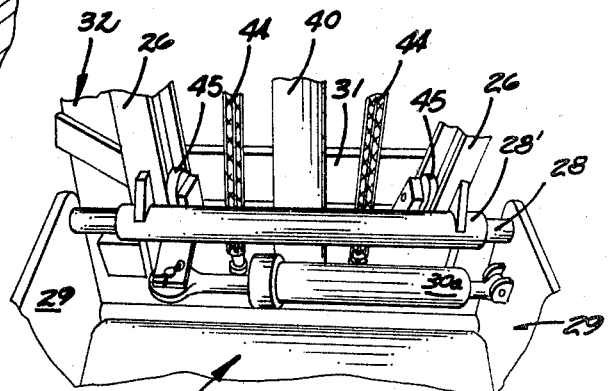
FIG. 6 is an enlarged fragmentary perspective view looking down upon the lower end of the hoist mechanism from the back side.

Also, the entire hoist subassembly can be shifted several inches transversely of the vehicle because the pivot connection at shaft 28 includes a collar 28' around shaft 28 that is shorter than shaft 28. The collar is secured to both the upright outer members 26 (FIG. 6), the shaft is secured between flanges 29 (FIGS. 5 and 6). A fluid cylinder 30a is secured between one flange and one outer member to shift the entire hoist sideways with sliding of collar 28' on shaft 28. This action is significant for cutting poles, as will be explained.

Secured to the non-elevating outer members 26 is the cutoff subassembly 16. Secured to the elevating portions of the hoist subassembly are the log positioning, compiling, and retaining subassemblies 22, 18 and 20.

More specifically, cutoff subassembly 16 is mounted to outer upright pillars 26 of the hoist by an elevated, horizontal, L-shaped mount which has a first beam 60 secured on one end to pillars 26 and extending transversely of the vehicle, and a second beam 60' secured to the outer end of beam 60 and extending rearwardly of the vehicle. Pivotally mounted to beam 60' at spaced intervals is a pair of first and second, depending, pivot links 62 and 64, one ahead of the other, to swing in a common vertical plane about their upper transverse end pivot mounts. Pivotally secured to the lower ends of both of these links is a forwardly extending lower swing beam 66, on the protruding front end of which is rotationally mounted a cutoff circular saw blade 68. Mounted on portion 66' of beam 66, forwardly of the blade axis, is a rotational hydraulic motor 70 operably connected by a chain 65 to shaft 67 of the saw blade to rotate it at high speed. This hydraulic motor is supplied with pressure through suitable hoses (not shown) from the second hydraulic pump 73. The forward end of swinging beam 66 is canted upwardly at an obtuse angle to the rearward end, for connection thereto of rearward link 62 which is purposely a few inches shorter than forward link 64 and is slightly downwardly divergent with respect thereto.

Figure 7:
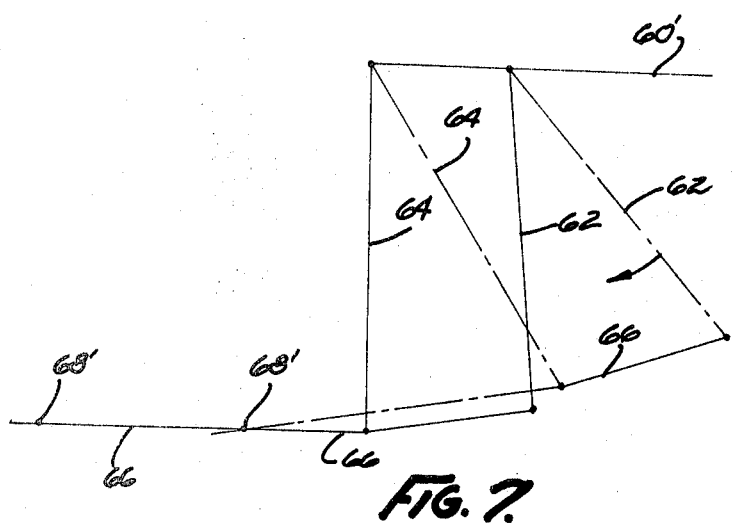
FIG. 7 is a schematic drawing illustrative of the movement of the saw subassembly.

Swinging movement of links 62 and 64, lower beam 66, and saw blade 68 is achieved by extension and contraction of a fluid cylinder 78 having its upper end connected to a collar beneath beam 60' and its lower end connected to a collar 69 on swinging beam 66 to the front of the attachment point of links 62 and 64 and rearwardly of the rotational axis of saw blade 68. The blade support linkage is basically a parallelogram linkage, but with the interconnecting links 62 and 64 being of slightly different length and slightly downwardly divergent toward the swinging beam. This causes a generally straight line movement of beam 66 and the saw in the cutting zone of the saw. That is, extension of cylinder 78 causes the mechanism to move forwardly and downwardly through an arc until links 62 and 64 are substantially vertical, and at this time, the structure causes beam 66 to move substantially linearly in the forward direction, i.e. horizontally, with the saw blade adjacent the fork lift mechanism and several inches above the ground. This special linkage enables the blade to be normally in a compact, out-of-the-way raised position when not cutting so as to not be bumped by poles being loaded onto the hoist or to hit objects during vehicle movement, and yet enables the blade to be extended through a long cutting sweep of about five feet while the blade is kept practically horizontal during its cutting sweep past the forks. This blade movement is represented in FIG. 7 by its rotational axis 68' on swinging beam 66. Beam 66, links 62 and 64, and beam support 60' are shown in two representative operative positions.

At the rearward end of the canted beam end 66 is a pair of coil tension springs 86 which extend upwardly to the rearward end of beam 60'. These are under tension at almost all times with movement of the blade, to apply a restraining force on the blade feeding action to prevent too rapid feeding. The springs tend to balance the too rapid feeding tendency which is due to the weight of the saw and its assemblage to apply a downward and forward bias, due to slack in the joints allowing this to happen, and due to pulling of the saw into the wood during cutting. Hence this restraining bias force is significant in most effective operation of the equipment. Return of the assembly rearwardly and upwardly is achieved by retraction of cylinder 78.

Subassembly 22 evens or aligns the ends of poles and measures the length to be cut. It basically includes a vertical panel 90 which extends forwardly adjacent the side of the fork lift, opposite the side where the saw blade is located. It is shiftable in a transverse direction toward the ends of poles under which the fork lift has been positioned. The panel is mounted at its upper rear corner to a transverse inner telescoping member 92 which fits within a fixed, cooperative, outer transverse telescoping member 94 that is secured to cross element 35 of carriage 32. These cooperating telescoping members 92 and 94 are polygonal in cross sectional configuration to prevent rotation therebetween. Lateral extension and contraction of panel 90 away from and toward the fork lift is achieved by a fluid cylinder 96 with one end secured to outer telescoping member 94 and the outer end secured to upstanding protrusion 90' of panel 90. This mechanism serves to push the ends of a group of poles into a generally planar relationship prior to cutting the poles into sticks. It also positions the ends of the poles at a predetermined distance from the plane of the saw blade to cause the cut sticks to be of a uniform predetermined measured length. If desired, adjustable stop means can be placed between telescoping members 92 and 94 to vary this length by varying the final position of panel 90.

Figure 2:
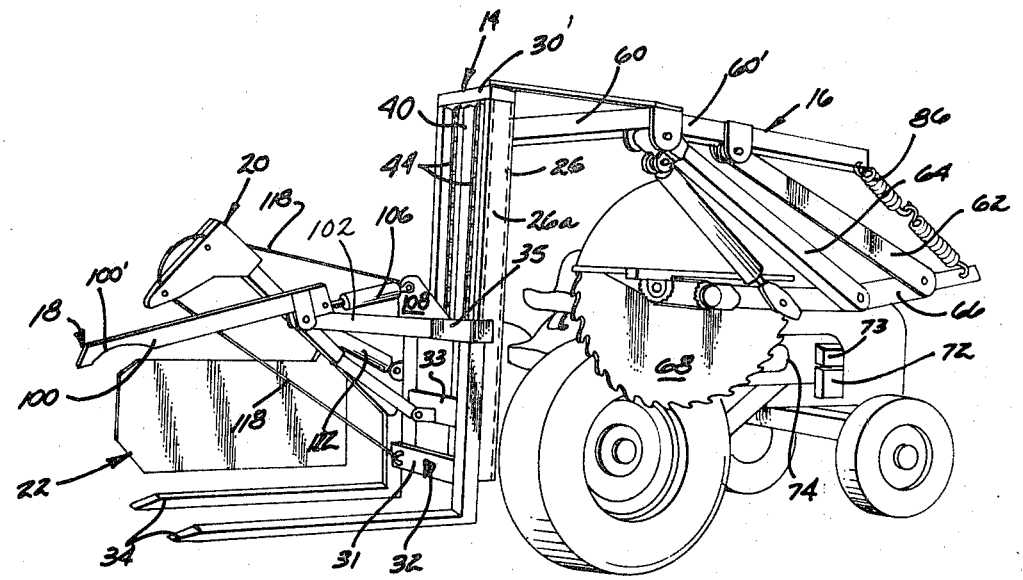
FIG. 2 is a perspective view of the machine shown from the right front end.
Figure 3:
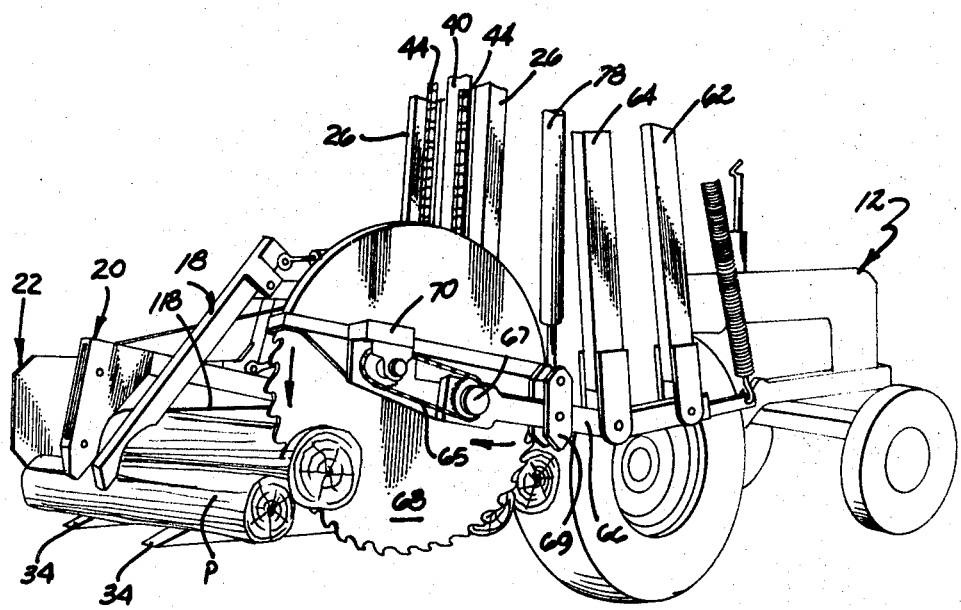
FIG. 3 is a perspective view similar to FIG. 2, but showing the machine in operation.

The compacting subassembly 18 includes a shiftable cantilever arm 100 which has its inner end pivotally mounted to a fixed, forwardly extending, cantilever beam 102 (FIG. 2) having its rearward end mounted to element 35 of carriage 32. A fluid cylinder 106 extends between a pivotal connection at the rear end of arm 100, offset from its pivotal connection to beam 102, and a mounting flange 108 extending upwardly from cantilever beam 102. Extension of this fluid cylinder pivots arm 100 about its pivot mount, causing it to shift toward the vertical and horizontal legs of the fork lift element, and specifically toward the junction of the legs, to push a series of poles on the fork lift element into a compacted position in the corner of the fork lift. The free end of arm 100 has a recess 100′ to create more horizontal force on the poles and alleviate vertical force onto the fork lift elements. This compactor also helps to clamp the poles as will be described.

Figure 4:
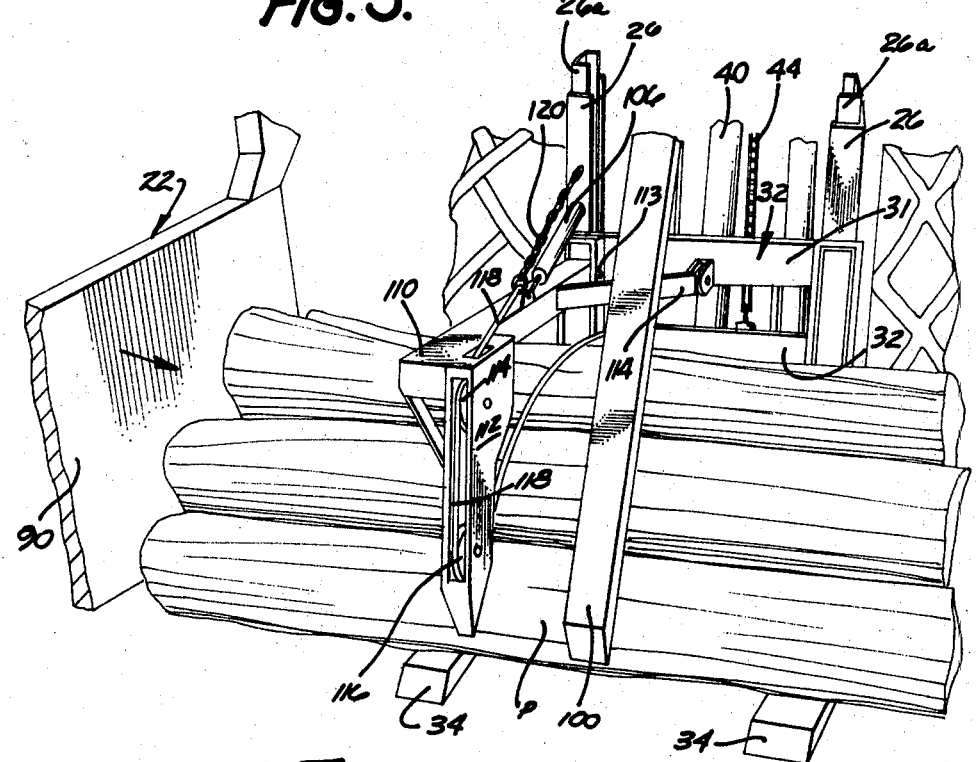
FIG. 4 is an enlarged front end perspective view of the machine shown in operation.

Adjacent compacting subassembly 18 is the primary clamping subassembly 20. This includes a forwardly extending cantilever beam 110 which has its rearward end pivotally mounted at pivot axis 113 to element 33, with a laterally diverging bracing member 114 also pivotally mounted to element 33. Projecting downwardly from the forward end of this cantilever beam 110 is a pulley housing 112 that has a pair of cable pulleys 114 and 116 (FIG. 4) rotationally mounted therein. Extending around these pulleys is a cable 118 having one end mounted to the lower part of carriage 32, specifically to cross element 31 above the junction of the vertical and horizontal legs of one of the fork members, and having its other end connected to a length adjusting chain 120 which is attached to a fixed hook 122 secured to the upper part of the carriage (FIG. 1). The lower portion of cable 118 therefore forms the diagonal leg of a triangle, to extend as a clamping band above the fork lift. In its raised position, it is provided with some slack. The assembly can be pivotally lowered with a fluid cylinder 122 that has its rearward portion mounted to carriage 32, specifically to the vertical leg of one of the members 34, and its forward portion pivotally attached to cantilever beam 110 intermediate its ends. Thus, extension of this cylinder lowers the clamping mechanism about its rearward lower pivot axis, and contraction of cylinder 122 raises it. The cable and chain together are in effect a non-stretching band. It is significant that the upper end of the band is connected (at 122) at a greater vertical distance from pivot axis 113 than the vertical distance between pivot axis 113 and the connection of the lower end of the band to the lower end of the carriage. This causes the cable to tighten as arm 110 is lowered. As a result of this tightening action, coupled with the wrapping of the lower portion of the band around the poles, it has been found that an excellent securing action occurs even though only one pole or a selected number of poles of different diameters are on the hoist forks. Since both ends of the band are secured to fixed points, a very large tensile force can be placed on the band, sufficient to prevent significant pinching of the saw blade, even though the weight of the long poles applies considerable leverage tending to pinch the blade. This clamping device operates in a vertical plane which is between the forks but closer to the fork adjacent panel 90 for maximum leverage on the gripped poles. This band effectively directly engages all of the outermost poles and indirectly retains the compacted inner poles to clamp them all tightly during the cutoff operation. The compacting subassembly supplements this clamping subassembly which is laterally spaced therefrom, by bracing the poles at a second point along their axial length. Usually the compactor and clamper cylinders are operated in parallel hydraulic circuits from the same valve so that whichever one offers the least resistance is operated, while both are operated generally simultaneously.

In operation, this single piece of machinery can accomplish the tasks of several men with several pieces of equipment and can do so more efficiently and rapidly. More specifically, the vehicle is advanced to a group of poles that are trimmed and lying alongside each other on the ground, the fork is marked under the poles by further advancing of the vehicle, the aligning mechanism 22 is shifted from an extended position toward the fork lift to align and even the ends of the poles and to push their ends to a measured distance from the saw, the compactor and gripper are actuated so that the compactor pushes the group of poles into a tight relationship on the L-shaped fork lift members, the clamp lowers to tighten its band securely around all of the poles. Next the hoist is elevated several inches to elevate the clamped ends of the poles into a position above the ground where they can be effectively cut by the swinging saw. Preferably the entire hoist mechanism is then shifted laterally several inches, with cylinder 30a (FIG. 6), in a direction away from the extending ends of the poles. This is done to remove any "bow" of the long poles caused by manipulating the poles, to lessen the tendency of the poles to pinch the saw blade. Then the cutoff saw is swung forwardly to cut off uniform length sticks. The hoist then elevates the cut off sticks several feet while moving the haulage vehicle or the like. When the fork lift is in position over the haulage vehicle, the clamping and compacting means are released while the fork lift is tilted forwardly to a position with the free ends of the lower legs of the lift tilted downwardly, to release the poles. The vehicle then moves back to the group of poles to grasp them again and make the next cut.

It has been found that one operator can cut the poles into uniform length sticks and load such at the rate of 40 cords a day or more with ease, while obtaining uniformity of pole length. Additional advantages of this apparatus will be readily apparent to those having ordinary skill in the art. It is conceivable that certain minor deviations in structure may be made in the unique apparatus without departing from the inventive concept presented. It is also conceivable that the novel gripping mechanism can be employed on other workpieces and/or other equipment.

I claim:

1. Pulp wood cutting and loading apparatus comprising: a vehicle; pole hoist means on said vehicle, extending in a first direction away from said vehicle to extend under and elevate poles for cutting into sections and for subsequently elevating and loading the cut sections onto a receiver; pole compacting and clamping means on said vehicle cooperative with said hoist means; and circular cutoff saw means mounted on movable support means attached to said vehicle, said support means including elevated mount means, and a swinging linkage pivotally attached thereto and depending therefrom; said circular cutoff saw means being suspended on said swinging linkage to swing therewith; power means to swing said linkage and cause said saw to move generally in said first direction adjacent to said hoist means, to cut the poles a group at a time.

2. The apparatus in claim 1 wherein said hoist means has horizontal portions for insertion under logs, and vertical portions extending up from said horizontal portions; said log compacting and clamping means includes compacting means shiftable generally toward both said horizontal portions and said vertical portions to shift the logs compactly together against said portions, and clamping means to hold the logs tightly in their compacted condition while being cut; and said clamping means includes flexible band means, and mounting means for said band means shiftable toward said hoist and poles thereon to force said band means against the periphery of the poles for clamping.

3. The apparatus in claim 1 wherein said cutoff saw means is mounted to reciprocate generally unidirectionally in the cutting zone adjacent said hoist means.

4. The apparatus in claim 3 wherein said cutoff saw means includes a circular saw blade axially mounted on a swinging beam forming one leg of a parallelogram type linkage, the opposite leg being fixed, and the positioning of the interconnecting legs therebetween being slightly divergent with respect to each other toward said swinging beam leg to cause said cutoff saw to move generally unidirectionally.

5. Apparatus for use on a fork lift vehicle, comprising: shiftable log compacting means and log clamping means constructed to cooperate with the vehicle fork lift to compact and clamp logs on the lift; powered cutoff saw means and support means therefor, shiftable mounting means mounting said cutoff saw means on said support means, said shiftable mounting means comprising a swinging suspended parallelogram linkage and power means connected to said linkage to shift said cutoff saw means with respect to the fork lift.

6. The apparatus in claim 5 wherein said clamping means includes flexible band means supported on the ends thereof for clamping around a group of poles.

7. The apparatus in claim 4 wherein said swinging beam leg includes an extension to which said saw blade is mounted.

8. The apparatus in claim 7 wherein the leg of said pair of interconnecting legs closest said beam extension is longer than the other leg of said pair.

9. The apparatus in claim 8 wherein the end portion of said swinging beam opposite said extended end is canted upwardly at an obtuse angle to the remainder thereof, and the shorter leg of said pair is pivotally attached to said canted end portion.

10. The apparatus in claim 4 including a biasing means attached to said linkage in a manner to apply a constant restraining bias on said linkage opposite to said one direction to prevent too rapid feed of the saw.

11. The apparatus in claim 2 wherein said band mounting means includes a cantilever arm pivotally mounted on one end to move down toward and up away from said horizontal portions, said flexible band extending from the outer end of said arm to a location on said apparatus spaced below said arm one end, and power means to lower said arm and band toward said platform to wrap said band around a group of poles.

12. The apparatus in claim 2 wherein said band mounting means includes a cantilever arm pivotally mounted at one end to move down toward and up away from said horizontal portions, said flexible band having one end affixed to said apparatus above said arm one end, extending around the second end of said arm, and having its second end affixed to said apparatus below said arm one end, the distance between said band one end and said arm one end being greater than the distance between said band second end and said arm one end, to cause said band to tighten as said arm is lowered toward said horizontal portions, and power means to lower said arm and band.

References Cited

UNITED STATES PATENTS

| | | | |
|---|---|---|---|
| 691,633 | 1/1902 | Jincks et al. | 143—91 |
| 3,074,447 | 1/1963 | Bombardier | 144—3 |
| 3,102,563 | 9/1963 | Horncastle | 144—3 |
| 3,198,225 | 8/1965 | Busch | 144—3 |
| 3,236,274 | 2/1966 | Eynon | 144—3 |
| 3,254,686 | 6/1966 | Boyd et al. | 144—3 |
| 3,269,436 | 8/1966 | Moore | 144—3 |

FOREIGN PATENTS 833,237  4/1960  Great Britain.

HARRISON L. HINSON, Primary Examiner

U.S. Cl. X.R.

143—43, 57, 146